(12) United States Patent
Lee et al.

(10) Patent No.: US 11,423,675 B2
(45) Date of Patent: Aug. 23, 2022

(54) SYSTEM AND METHOD FOR DETECTING ACTIVENESS OF DRIVER

(71) Applicant: Electronics and Telecommunications Research Institute, Daejeon (KR)

(72) Inventors: Seung Jun Lee, Daejeon (KR); Dae Sub Yoon, Daejeon (KR); Oh Cheon Kwon, Sejong-si (KR); Woo Jin Kim, Daejeon (KR); Hyun Suk Kim, Daejeon (KR); Hyun Woo Joe, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/103,360

(22) Filed: Nov. 24, 2020

(65) Prior Publication Data
US 2021/0158063 A1 May 27, 2021

(30) Foreign Application Priority Data

Nov. 26, 2019 (KR) .................. 10-2019-0153737

(51) Int. Cl.
| | |
|---|---|
| *G06K 9/00* | (2022.01) |
| *G06K 9/20* | (2006.01) |
| *H04N 5/232* | (2006.01) |
| *G06V 20/00* | (2022.01) |
| *G06V 20/59* | (2022.01) |
| *G06V 10/22* | (2022.01) |

(52) U.S. Cl.
CPC ............ *G06V 20/597* (2022.01); *G06V 10/22* (2022.01); *H04N 5/23218* (2018.08)

(58) Field of Classification Search
None
See application file for complete search history.

(56) References Cited

U.S. PATENT DOCUMENTS

| | | | |
|---|---|---|---|
| 8,862,317 B2 | 10/2014 | Shin et al. | |
| 9,183,176 B2 | 11/2015 | Lee et al. | |
| 10,078,331 B2 | 9/2018 | Kim et al. | |
| 2004/0090334 A1* | 5/2004 | Zhang .................... | G08B 21/06 340/575 |
| 2015/0085124 A1* | 3/2015 | Poppe ...................... | A61B 5/18 348/148 |
| 2019/0366844 A1 | 12/2019 | Yoon et al. | |
| 2020/0130771 A1* | 4/2020 | Jacobsz Rosier ...... | B62K 19/08 |

(Continued)

FOREIGN PATENT DOCUMENTS

| | | |
|---|---|---|
| KR | 10-2012-0006406 | 1/2012 |
| KR | 20150076627 A | 7/2015 |

(Continued)

*Primary Examiner* — Edemio Navas, Jr.
(74) *Attorney, Agent, or Firm* — Kile Park Reed & Houtteman PLLC

(57) ABSTRACT

Provided is a system for detecting activeness of a driver, the system including a camera configured to photograph the driver, a camera moving module configured to move the camera, and a camera operation processor configured to detect the activeness of the driver by processing an image captured by the camera and control the camera to move using the camera moving module according to the detected activeness of the driver.

18 Claims, 8 Drawing Sheets

(56) References Cited

U.S. PATENT DOCUMENTS

2020/0309548 A1* 10/2020 Shintani .............. G01C 21/3617
2021/0031687 A1*  2/2021 Kim ....................... B60R 11/04
2021/0044779 A1*  2/2021 Prins ....................... H04N 7/15

FOREIGN PATENT DOCUMENTS

| KR | 10-2017-0135573 | 12/2017 |
| KR | 10-2018-0070401 | 6/2018 |
| KR | 10-2019-0095199 | 8/2019 |

* cited by examiner

PA1

PA2

SYSTEM AND METHOD FOR DETECTING ACTIVENESS OF DRIVER

CROSS-REFERENCE TO RELATED APPLICATION

This application claims the benefit of Korean Patent Application No. 10-2019-0153737, filed on Nov. 26, 2019, in the Korean Intellectual Property Office, the disclosure of which is incorporated herein in its entirety by reference.

BACKGROUND

1. Field

The present disclosure relates to a system and method for detecting activeness of a driver, and more particularly, to a system for detecting activeness of a driver to detect an activeness level of the driver in an autonomous vehicle.

2. Description of the Related Art

While an autonomous vehicle is operating in the autonomous driving mode, a driver can do more things other than driving.

As well as using a smartphone or having a meal, the driver is easily likely to feel drowsy because he or she does not drive.

In order to allow the driver to smoothly receive the control right when it is necessary to switch from the autonomous driving mode to the manual driving mode, monitoring of the driver is essential in the autonomous vehicle, and driver monitoring through a camera may become mandatory.

Meanwhile, many studies have already been conducted on a method of detecting the driver's drowsiness by collecting image data using a camera, and commercial products are being used.

However, the criteria for determining the driver's state in autonomous driving need to be further subdivided.

A level of whether the driver can smoothly receive the control right can be classified according to the driver's condition of drowsiness or non-drowsiness, and in a non-drowsy state, the level can be further classified according to whether the driver is thinking of driving.

However, with a single camera installed near a steering wheel, it is difficult to discern an image where the driver is sleeping from an image where the driver is looking at his mobile phone with his or her head down.

Monitoring with an increased number of cameras requires more computing power and increases wiring in the vehicle, which is disadvantageous in terms of design and cost.

In addition, in a system for switching an autonomous driving control right, a notification method for stimulating visual, auditory, and tactile senses to increase activeness of the driver in each state of the driver by a driver monitoring system may be included as well as monitoring a driver's state.

However, if the driver is not stimulated with an appropriate method and an appropriate amount of stimulation, the driver may be surprised and this may pose a risk to driving, and repeated excessive stimulation may create tolerance to the corresponding stimulation, reducing the effect of the notification.

SUMMARY

The present disclosure is designed to solve the above problem and provides a system for detecting activeness of a driver, the system which accurately determines a state of the driver so that the driver can trust and use the system when the system takes an appropriate action in response to the determined state.

In addition, the present disclosure provides a method of detecting activeness of a driver, the method in which accuracy of detection of the driver's face and gaze is increased to measure the activeness of the driver in second and third levels of an autonomous vehicle while the number of cameras for monitoring the driver's state is limited to one.

Further, the present disclosure provides a system for detecting activeness of a driver, the system which is capable of increasing the activeness of the driver who is overly immersed in other activities.

The aspects of the present disclosure are not limited to the above-described effects, and other unmentioned aspects will be clearly understood to those skilled in the art from the description of claims.

In one general aspect of the present disclosure, there is provided a system for detecting activeness of a driver, the system including a camera configured to photograph the driver, a camera moving module configured to move the camera, and a camera operation processor configured to detect the activeness of the driver by processing an image captured by the camera and control the camera to move using the camera moving module according to the detected activeness of the driver.

The camera moving module may include a rail on which the camera is mounted to move, a camera one-axis drive module configured to control the camera to move on the rail, and a camera a two-axis drive module configured to adjust an angle of the camera.

The camera operation processor may be further configured to determine whether a gaze direction of the driver is looking ahead by recognizing a position of a face of the driver photographed by the camera and, when it is determined that the driver has been looking ahead for a predetermined time, set the activeness of the driver to a high level.

The camera operation processor may be further configured to, when it is determined that the driver has not been looking ahead for a predetermined time, move a position of the camera to photograph a face of the driver whose head is down and, when it is determined that the driver has been looking ahead for the predetermined time, set the activeness of the driver to normal.

The camera operation processor may be further configured to determine whether the driver reacts to the movement of the camera and, when it is determined the driver reacts to the movement of the camera, set the activeness of the driver to a normal level.

The camera operation processor may be further configured to, when it is determined that the driver does not react to the movement of the camera, detect the face and the gaze direction of the driver to determine whether the driver is in a drowsy state and, when the driver is in the drowsy state, set the activeness of the driver to a low level.

The camera operation processor may be further configured to, when the driver is not in the drowsy state, determine whether the driver is looking ahead, when the driver is not looking ahead, detect the face and the gaze direction of the driver and, when the driver is looking ahead, determine whether the driver has been looking ahead for a predetermined time.

The system may further include a display configured to display an operation state of the camera, and the display may be located on one side of the camera and configured to change one of color and brightness according to the activeness of the driver.

The camera operation processor may be further configured to monitor whether the driver reacts while the camera moves on the rail by the camera one-axis drive module so as to determine whether the driver is in an overly-immersed state or in a drowsy state.

The camera operation processor may be further configured to, when the camera is to be moved to determine whether the driver is in an intense state since the activeness of the driver is not at a high level, adjust an angle and a moving direction of the camera by comparing a previous frame and a current frame in terms of a driver recognized area.

In another aspect of the present disclosure, there is provided a method for detecting activeness of a driver, the method including photographing the driver, determining whether a gaze of the driver is looking ahead by detecting the gaze of the driver from a captured image; and setting the activeness of the driver according to whether the gaze of the driver is looking ahead.

The setting of the activeness of the driver according to whether the gaze of the driver is looking ahead may include recognizing a gaze direction of the driver by recognizing a position of a face of the driver photographed by the camera, determining whether the recognized gaze direction of the driver is looking ahead, and when it is determined that the gaze of the driver is looking ahead, setting the activeness of the driver to a high level.

The method may further include, when it is determined the gaze of the driver is not looking ahead, moving a position of the camera so as to photograph the face of the driver whose head is down, determining whether the driver has been looking ahead for a predetermined time from an image captured by the camera whose position has been moved and, when it is determined that the driver has been looking ahead for the predetermined time, setting the activeness of the driver to a normal level.

The moving of the position of the camera so as to photograph the face of the driver whose head is down may further include determining whether there is any reaction of the driver while the camera is moving and, when it is determined there is any reaction of the driver, setting the activeness of the driver to a normal level.

The method may further include, when it is determined that there is no reaction of the driver, detecting the face and the gaze direction of the driver and, when the driver is in a drowsy state, setting the activeness of the driver to a low level.

The method may further include, when the driver is not in the drowsy state, determining whether the driver is looking ahead, when the driver is not looking ahead in a state other than the drowsy state, detecting of the face and the gaze direction of the driver and, when the driver is looking ahead, determining whether the driver has been looking ahead for a predetermined time.

The displaying of the operation state of the camera may include monitoring whether the driver reacts while the camera moves on the rail by a camera one-axis drive module so as to determine whether the driver is in an overly-immersed state or in the drowsy state.

In another aspect of the present disclosure, there is provided a method for detecting activeness of a driver, the method including photographing the driver, determining whether the gaze of the driver is looking ahead by detecting a gaze of the driver from a captured image, when it is determined that the gaze of the driver is looking ahead, moving the camera, determining whether the driver reacts to the moving camera based on an image captured by the moving camera and, when it is determined that the driver reacts to the moving camera, setting the activeness of the driver to a normal level.

The method may further include, when it is determined that the gaze of the driver is looking ahead, setting the activeness of the driver to a high level.

The method may further include, when it is determined that the driver does not react to the moving camera, setting the activeness of the driver to a low level.

According to an embodiment of the present disclosure, unlike a conventional system which, when a driver is determined to be in a drowsy state even while driving due to an error in monitoring of the driver, provides a notification according to this result which may bring only unnecessary effects, the present disclosure has effects of providing a notification while performing monitoring, and thus, when the driver's activeness is at a low level, the camera moves and it does not bother much if the driver is actually driving.

In addition, according to an embodiment of the present disclosure, there is an additional effect of reminding an overly-immersed person of naturally thinking of driving, by letting the person hear the sound of the movement of the camera or seeing an LED moving together with the camera.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Advantages and features of the present disclosure and a method of achieving the same will be clearly understood from embodiments described below in detail with reference to the accompanying drawings. However, the present disclosure is not limited to the following embodiments and may be implemented in various different forms. The embodiments are provided merely for complete disclosure of the present disclosure and to fully convey the scope of the invention to those of ordinary skill in the art to which the present disclosure pertains. The present disclosure is defined only by the scope of the claims. Meanwhile, terms used in this specification are used only in order to describe specific embodiments rather than limiting the present disclosure. In this specification, the singular forms are intended to include the plural forms as well, unless the context clearly indicates otherwise. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
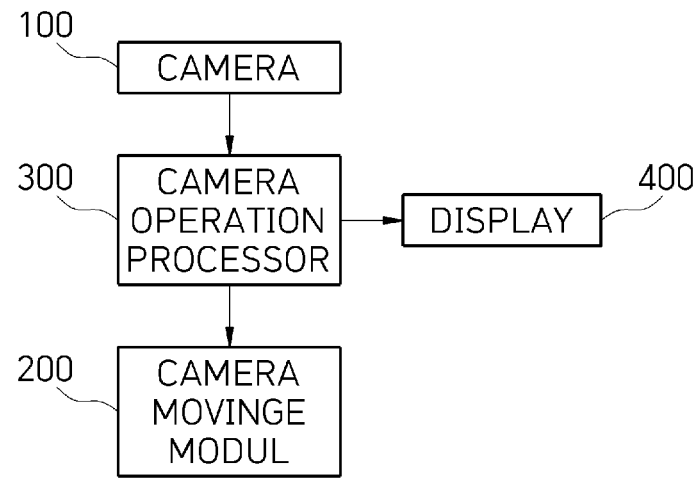
FIG. 1 is a functional block diagram illustrating a system for detecting activeness of a driver according to an embodiment of the present disclosure.

FIG. 1 is a functional block diagram illustrating a system for detecting activeness of a driver according to an embodiment of the present disclosure.

As shown in FIG. 1, a system for detecting activeness of a driver according to an embodiment of the present disclosure may include a camera 100, a camera moving module 200, and a camera operation processor 300.

The camera 100 may acquire an image by photographing the driver. Here, the camera 100 may use one or more of an RGB camera, a depth camera, and an infrared camera.

Figure 2:
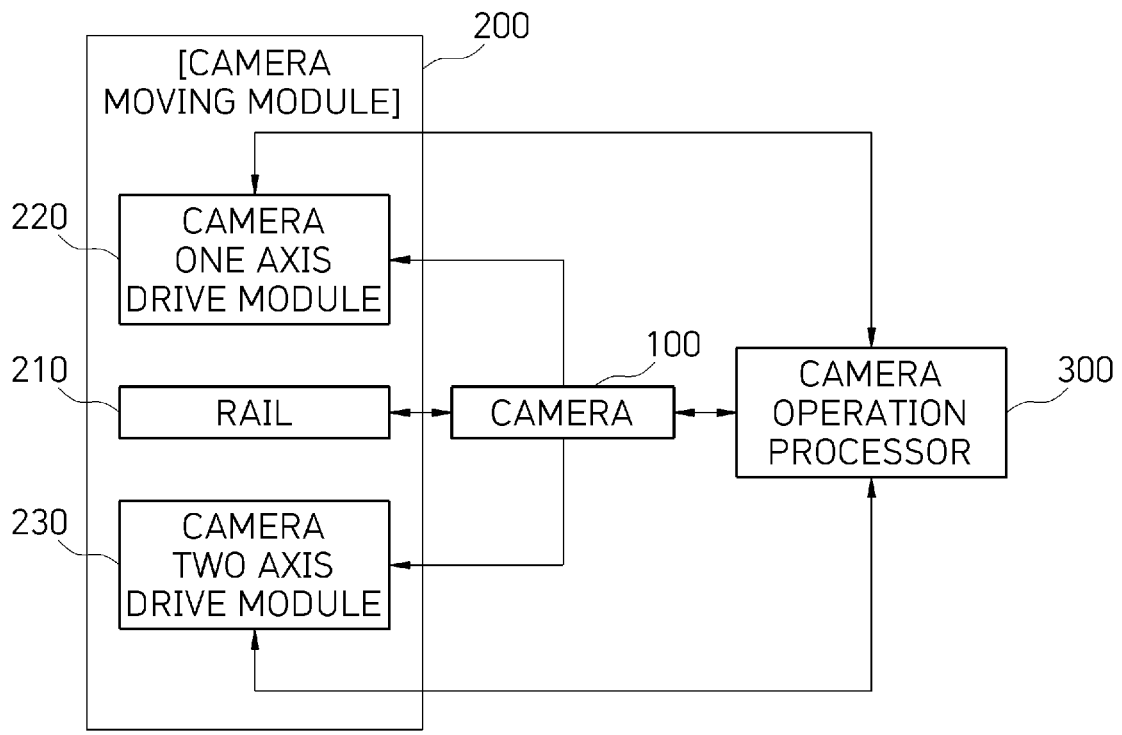
FIG. 2 is a block diagram illustrating a camera moving module of FIG. 1.

The camera moving module 200 may serve to move the camera 100. As shown in FIG. 2, the camera moving module 200 in this embodiment may include a rail 210 for moving the camera 100, a camera one-axis drive module 220 for controlling the camera 100 to move on the rail, and a camera two-axis drive module 230 for adjusting an angle of the camera 100.

Figure 3:
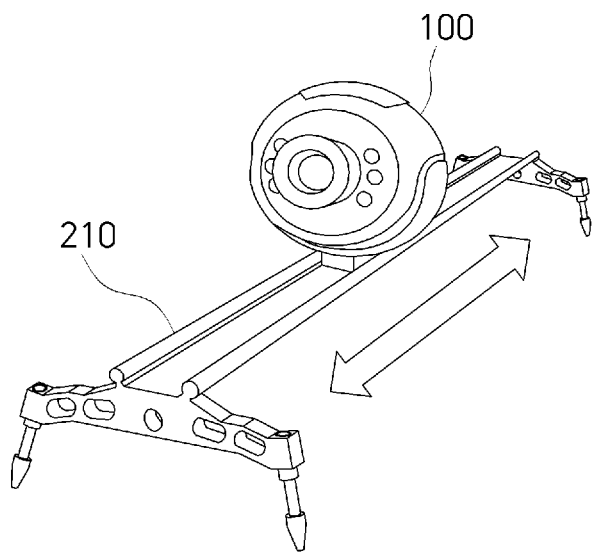
FIG. 3 is a reference diagram for explaining a structure in which a camera and a rail are combined.
Figure 4:
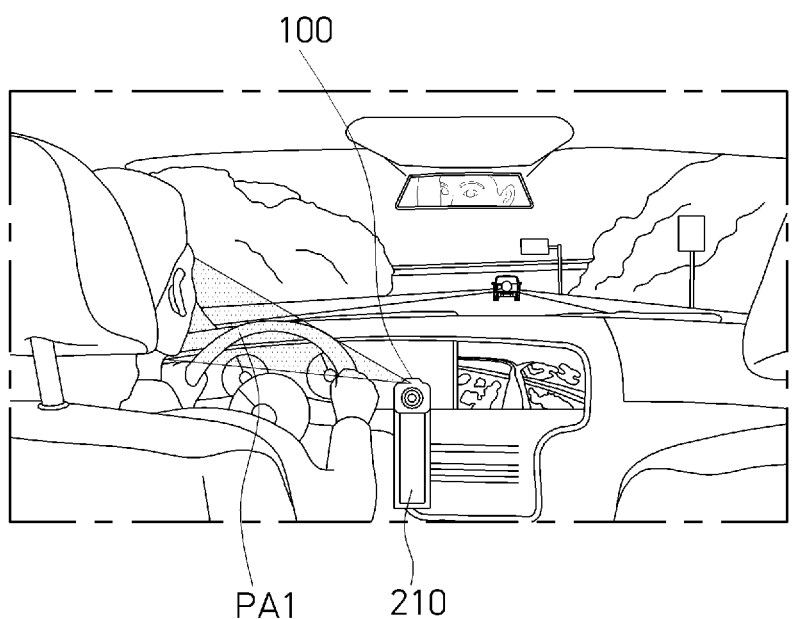
FIG. 4 is a reference diagram for explaining a structure of the present disclosure installed in a vehicle.

FIG. 3 is a diagram for explaining a structure in which a camera and a rail are combined, and FIG. 4 is a diagram for explaining a structure in which the present disclosure is installed in a vehicle.

The camera operation processor 300 may detect activeness of a driver by performing calculation on an image captured by the camera 100, and may control the camera 100 using the camera moving module 200 to move according to the detected activeness of the driver.

Figure 5:
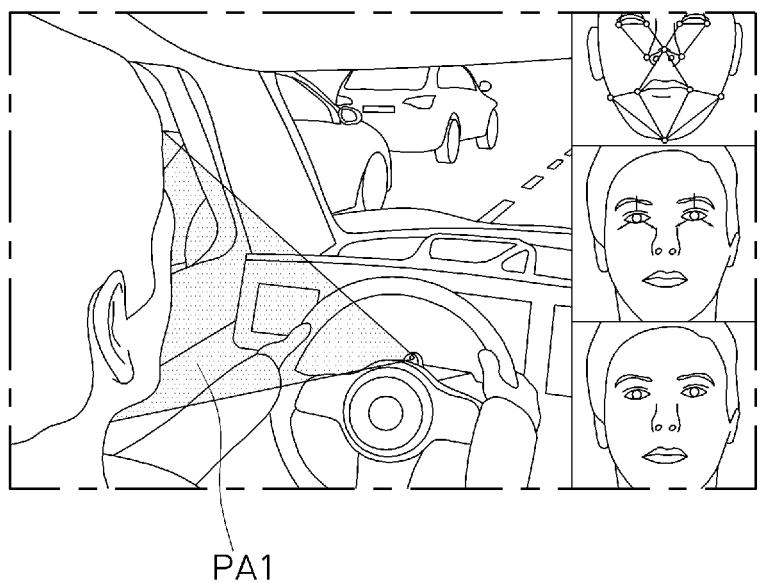
FIG. 5 is a reference diagram for explaining a diagram for initially photographing a driver using a camera operation processor in an embodiment of the present disclosure.

In this case, the camera operation processor 300 may recognize a position of a face of the driver photographed (PA1) using the camera 100 at an initial position, as shown in FIG. 5, to determine whether a gaze direction of the driver is looking ahead. When it is determined that the driver has been looking ahead for a predetermined time, the camera operation processor 300 may set the activeness of the driver to a high level. That is, it is possible to recognize the face and the gaze direction of the driver from an image captured by the camera 100.

Figure 6:
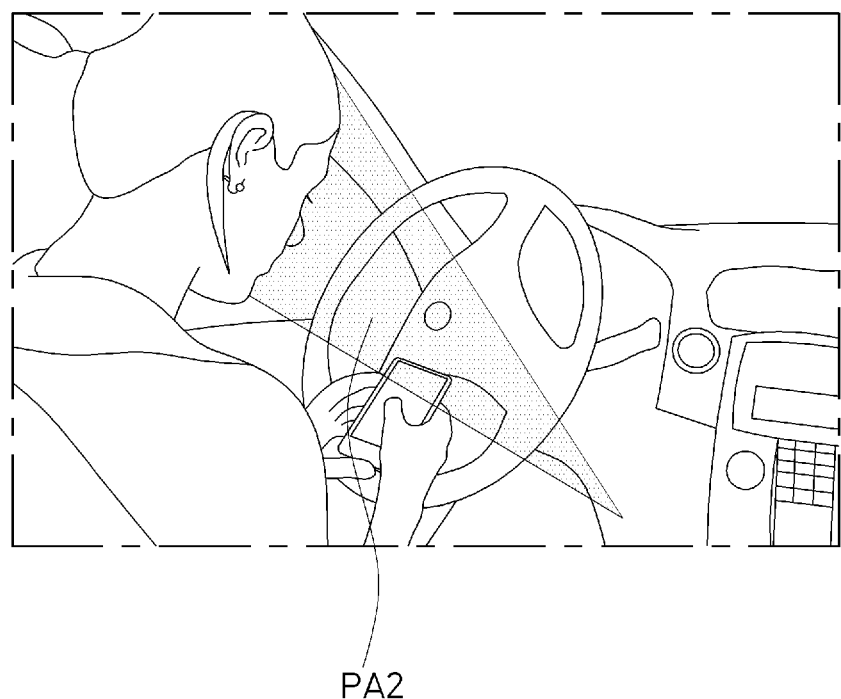
FIG. 6 is a reference diagram for explaining a state in which a driver is photographed by moving a camera when the driver does not look ahead in an embodiment of the present disclosure.

On the contrary, when it is determined that the driver has not been looking ahead for the predetermined time, the camera operation processor 300 may move a position of the camera 100 to photograph the face of the driver whose head is down, as shown in FIG. 6. Thereafter, the camera operation processor 300 may determine a current state as an intense state, and when it is determined using an image photographed (PA2) by the camera 100, whose position is being changed, that the driver has been looking ahead for the predetermined time, the activeness of the driver may be set to a normal level.

Conversely, when it is determined that the camera 100 has not been looking ahead for the predetermined time after the position of the camera 100 is changed, the activeness of the driver may be set to a low level.

Hereinafter, there will be described a method in which the camera operation processor 300 according to an embodiment of the present disclosure determines whether the driver is "thinking of driving" when the activeness of the driver is not looking ahead, that is, when the driver is in an intense state.

First, when the gaze of the driver is not looking ahead, the camera operation processor 300 may move the camera 100 to a position at which the driver can be photographed.

In this case, the camera operation processor 300 may determine whether the driver to be photographed shows any reaction while the camera 100 moves.

When there is any reaction of the driver while the camera 100 is moved, the camera operation processor 300 may set the activeness of the driver to a normal level. On the contrary, when there is no reaction of the driver, the camera operation processor 300 may determine whether the driver is in a drowsy state by detecting a face and a gaze direction of the driver. When it is determined that the driver is in the drowsy state, the camera operation processor 300 may set the activeness of the driver to a low level Meanwhile, when the driver is not in the drowsy state, the camera operation processor 300 may determine whether the driver is looking ahead.

In this case, when the driver is not looking ahead, the camera operation processor 300 may detect the face and the gaze direction of the driver, and when the driver is looking ahead, the camera operation processor 300 may determine whether the driver has been looking ahead for a predetermined time.

When there is no reaction from the driver even though the camera 100 continuously monitors the driver while moving downward, whether the driver is in an overly-immersed state or a drowsy state may be determined to determine whether the activeness of the driver is at a normal level or a low level.

That is, since the camera 100 monitors the face of the driver from a low position, it is possible to increase the accuracy of measurement of eye blinking and gaze movement and to discriminate the driver's state.

Meanwhile, in an embodiment of the present disclosure, a display 400 for displaying an operating state of the camera 100 may be further provided. The display 400 may be located on one side of the camera 100 and may change color and brightness according to activeness of the driver.

When it is necessary to adjust an angle of the camera according to the driver's activeness information calculated by the camera operation processor 300, an instruction may be applied to the camera two-axis drive controller 230 to control the angle so that measurement can be performed appropriately.

In addition, the camera 100 is designed to move on the rail 210. When it is necessary for the camera 100 to move on the rail 210, the camera operation processor 300 may apply an instruction to the camera one-axis drive module 220 so that the camera 100 can move on the rail 210. In the present embodiment, the rail 210 on which the camera 100 moves is described with an example of one axis, but the rail 210 may be designed with two axes such as an L shape and thus the shape of the rail 210 is not limited. In addition, the rail 210 is installed inside a vehicle and a position thereof is not limited. However, in an example of the present disclosure, the rail 210 may be installed in a direction vertical to the ground, and the camera 100 may move along the rail 210.

In addition, automatic control may be performed using the camera two-axis drive module 230 and the camera operation processor 300, so that accurate measurement can be performed by controlling a head of the camera 100 using two axes.

The display 400 is located next to the camera 100 and may display activeness of the driver by color of LEDs or by a three-stage graph. In addition, even when the camera 100 moves on the rail 210, the activeness of the driver may be identified using the LED during the corresponding operation. In the present embodiment, the display 400 is described as an LED, but an acoustic device such as a speaker capable of outputting a certain warning sound may be used.

In addition, the camera operation processor 300 may transmit the activeness of the driver to a driver monitoring system (not shown) so that the corresponding system can separately provide an alternative suitable for the driver's state.

Hereinafter, a method of controlling the camera one-axis drive controller 220 and the camera two-axis drive controller 230 according to an embodiment of the present disclosure will be described.

The camera operation processor 300 may first recognize a face of a driver photographed using the camera 100 and detect gaze information from the face.

Therefore, an initial installation position of the camera 100 is preferably set to move the position and the angle of the camera 100 so that the face of the driver can be photographed in a wide area.

Meanwhile, when the camera 100 is moved to confirm an intense state because the activeness of the driver is not at a high level, the camera operation processor 300 may compare a previous frame, which is previously captured using the camera, with a currently captured frame in terms of a driver recognized area and adjust the angle of the camera 100.

In addition, since the camera 100 moves on the rail along one axis, the camera operation processor 300 may detect driving during the movement of the camera 100 to determine which direction to move the camera 100 when the angle of the camera 100 is adjusted and then may perform fine adjustment in the determined direction.

According to an embodiment of the present disclosure, unlike a conventional system which, when a driver is determined to be in a drowsy state even while driving due to an error in monitoring of the driver, provides a notification according to this result which may bring only unnecessary effects, the present disclosure has effects of providing a notification while performing monitoring, and thus, when the activeness of the driver is at a low level, the camera moves and it does not bother much if the driver is actually driving.

In addition, according to an embodiment of the present disclosure, there is an additional effect of reminding an overly-immersed person to naturally think of driving, by letting the person hear the sound of the movement of the camera or seeing an LED moving together with the camera.

As described above, according to the present disclosure, it is determined whether the driver is ready to drive in order to use a mobile phone, eat food, or perform other tasks during autonomous driving, and in order for the driver to smoothly receive the driving control right after the autonomous driving is over. For a criteria for the determination, the perception that the driver is sitting in the driver seat and keeping driving should be maintained.

If this is called "thinking of driving", whether the driver is thinking of driving may be inferred by measuring how often the driver is looking ahead.

When the driver is thinking of driving, the driver may frequently look ahead. When the driver is not thinking of driving, that is, when the driver is in an overly-immersed state or in a drowsy state, the driver may not frequently look ahead.

In order to monitor the driver's state, the camera 100 may move to a position where the face and the posture of the driver can be easily captured, and the angle of the camera 100 may be controlled using the camera two-axis drive controller 230.

In the basic state, whether the driver is looking ahead may be determined, as described above.

In the intense state, the position of the camera may be moving to a lower position on the rail, and hence, a gaze of a person who is using the smartphone with his or her head down may be monitored.

Because the composition is changed by moving the camera, even a single camera may show high measurement accuracy without blind spots.

Figure 7:
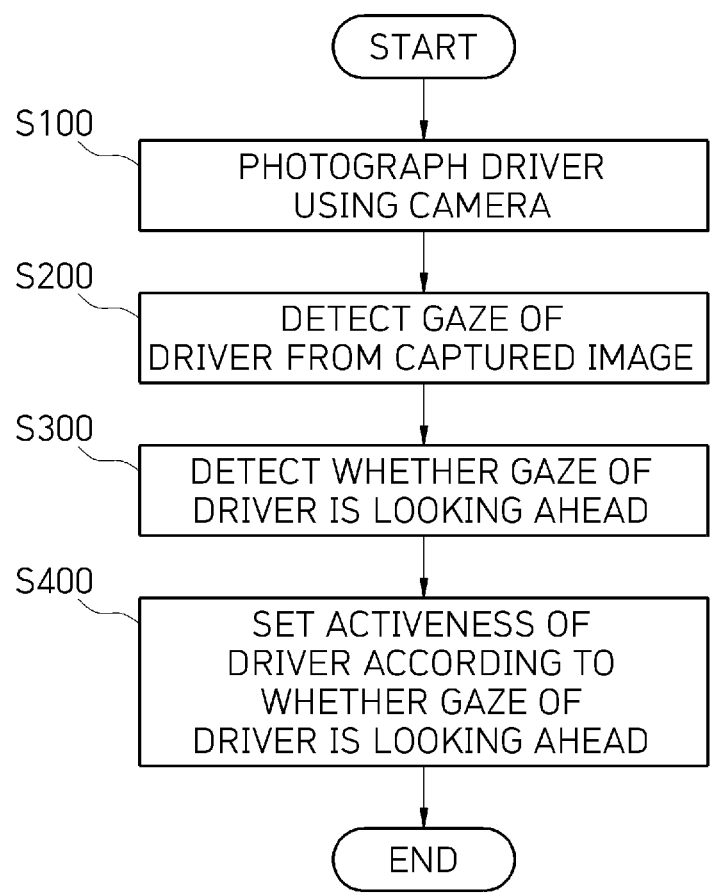
FIG. 7 is a flowchart illustrating a method of detecting activeness of a driver according to an embodiment of the present disclosure.

Hereinafter, a method for detecting activeness of a driver according to an embodiment of the present disclosure will be described with reference to FIG. 7.

First, a driver may be photographed using a camera in operation S100.

Then, a gaze of the driver may be detected from the photographed image in operation S200, and whether the gaze of the driver is looking ahead may be detected in operation S300.

Then, the activeness of the driver may be set according to whether the gaze of the driver is looking ahead in operation S400.

Figure 8:
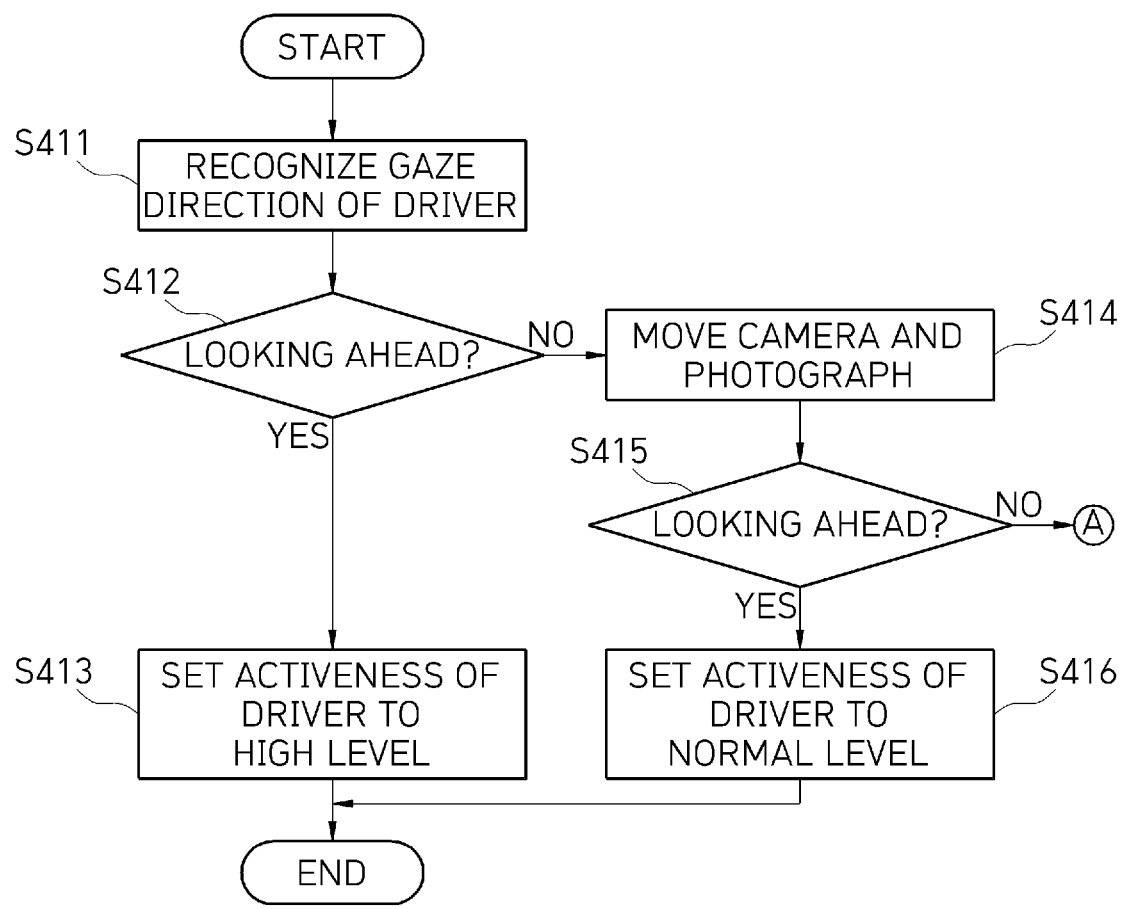
FIGS. 8 and 9 are flowcharts illustrating an operation of setting activeness of a driver according to whether the driver's eyes of FIG. 7 is looking ahead.
Figure 9:
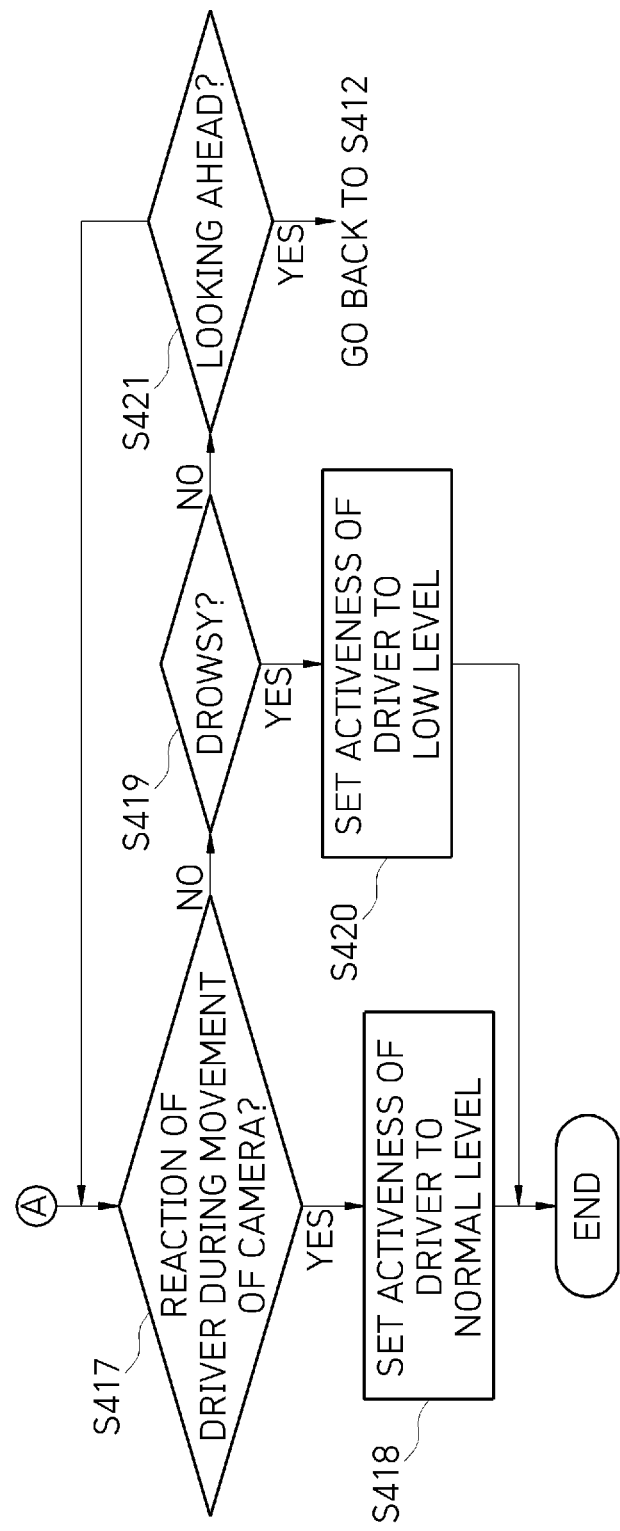

The operation S400 of setting the activeness of the driver according to whether the gaze of the driver is looking ahead will be described with reference to FIGS. 8 and 9.

First, a gaze direction of the driver may be recognized by recognizing a position of a face of the driver from an image captured using the camera 100 at an initial position in operation S411.

Then, whether the recognized gaze direction of the driver is a direction to look ahead may be determined in operation S412.

In operation S412 of determining whether the gaze of the driver is looking ahead, when the gaze of the driver is looking ahead (YES), the activeness of the driver may be set to a high level in operation S413.

Meanwhile, in operation S412 of determining whether the gaze of the driver is looking ahead, when the gaze of the driver is not looking ahead (NO), the driver may be photographed while a position of the camera moves in operation S414 so that the driver with his or her head down can be photographed.

Then, whether the driver has been looking ahead for a predetermined time may be determined based on images captured by the camera 100 whose position has been moved in operation S415.

Then, in operation S415 of determining whether the driver has been looking ahead for the predetermined time based on the images captured by the camera whose position has been moved, when it is determined the driver has been looking ahead for the predetermined time (YES), the activeness of the driver may be set to a normal level in operation S416.

Meanwhile, while the position of the camera moves so as to photograph the face of the driver whose head is down, whether there is any reaction of the driver while the camera moves may be determined in operation S417

In operation S417 of determining whether there is any reaction of the driver, when there is any reaction of the driver while the camera moves (YES), the activeness of the driver may be set to a normal level in operation S418.

On the other hand, in operation S417 of determining whether there is any reaction of the driver, when there is no reaction of the driver (NO), the face and the gaze direction of the driver may be detected again to determine whether the driver is in a drowsy state in operation S419.

In operation S419 of determining whether the driver is in the drowsy state, when the driver is in the drowsy state, the activeness of the driver may be set to a low level in operation S420.

On the other hand, in operation S419 of determining whether the driver is in the drowsy state, when the driver is not in the drowsy state (NO), whether the driver is looking ahead may be determined again in operation S421.

In operation S421 of determining whether the driver is looking ahead, when the driver is not looking ahead (NO), the driver's reaction may be determined by detecting the face and the gaze direction of the driver in operation S417. If the driver is looking ahead (YES), whether the driver has been looking ahead for the predetermined time may be determined again in operation S412.

According to an embodiment of the present disclosure, it is possible to reduce blind spots even with one camera installed inside a vehicle and to determine whether a driver's driving control right can be transferred, and thus, there is an effect of simplifying system complexity through operation processing computing power and in-vehicle wiring design as number of cameras increases.

In addition, according to an embodiment of the present disclosure, compared to a method of giving a notification to the driver through a monitor, an LED installed in the vehicle, and a speaker to increase the activeness of the driver, the camera is moved to fall on the user's gaze, and thus, there is an effect of maintaining the driver to think of driving by naturally reminding the driver that he or she is being monitored.

By changing the position of the camera to suit the position and direction of the driver's head, it was confirmed that recognition accuracy can be increased to 80% or more through experiments.

According to an embodiment of the present disclosure, when the driver is determined to be in the drowsy state even while driving due to an error in monitoring of the driver, a conventional system gives a notification according to this result, which may bring only unnecessary effects, but the present disclosure has effects of providing a notification while performing monitoring, and thus, when the activeness of the driver is at a low level, the camera moves and it does not bother much if the driver is actually driving.

In addition, according to an embodiment of the present disclosure, there is an additional effect of reminding an overly-immersed person of naturally thinking of driving, by letting the person hear the sound of the movement of the camera or seeing an LED moving together with the camera.

As such, there are cases of using a cell phone, eating, or performing other tasks during autonomous driving, and whether the driver is ready to drive is determined in order for the driver to transfer the driving control smoothly after the autonomous driving is over, and thus, as a criteria for the determination, the perception that the driver is sitting in the driver seat and keeping driving should be maintained.

If this is called "thinking of driving", whether the driver is thinking of driving may be inferred by measuring how often the driver is looking ahead.

When the driver is thinking of driving, the driver may frequently look ahead. When the driver is not thinking of driving, that is, in an overly-immersed state or in a drowsy state, the driver may not frequently look ahead.

To monitor this, the camera 100 may move to a position where the face and the posture of the driver can be easily captured, and the camera's angle may be controlled using the camera two-axis drive controller 230.

In the basic state, whether the driver is looking ahead may be determined, as described above.

In the intense state, the position of the camera is moving to a lower position on the rail, so that a gaze of a person who is using the smartphone with his/her head down can be monitored.

Because the composition is changed by moving the camera, even a single camera may achieve high measurement accuracy without a blind spot.

Figure 10:
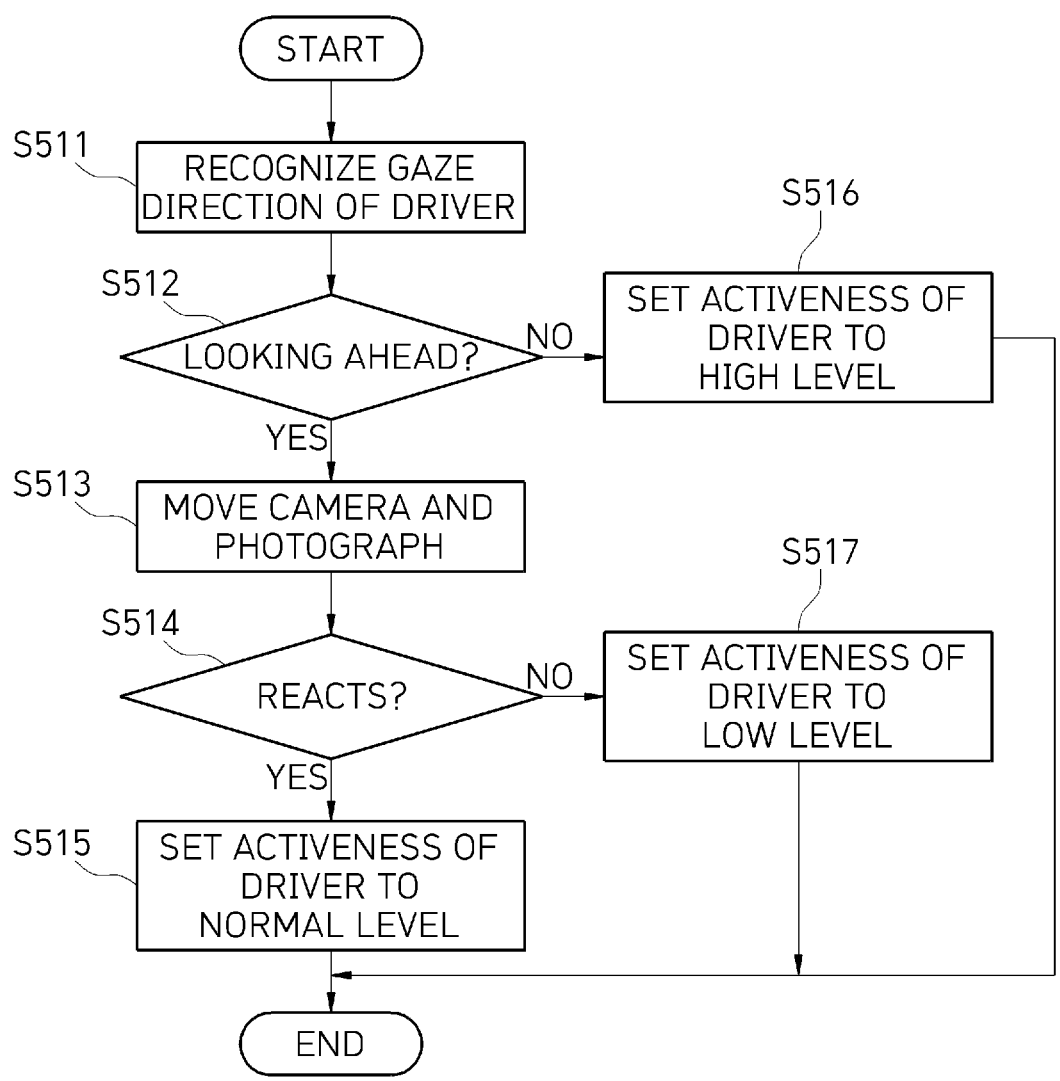
FIG. 10 is a flowchart illustrating a method of detecting activeness of a driver according to another embodiment of the present disclosure.

Hereinafter, names according to another embodiment of the present disclosure will be described with reference to FIG. 10.

First, a driver may be photographed using a camera in operation S511.

Next, whether a gaze of the driver is looking ahead may be determined in operation S512 by detecting the gaze of the driver from a captured image.

In operation S512, when the gaze of the driver does not look ahead (NO), the camera may be moved in operation S513.

Next, whether the driver reacts to the moving camera may be determined based on the image captured by the moving camera in operation S514.

In operation S514 of determining whether the driver reacts to the moving camera, whether the driver reacts to the moving camera (YES), activeness of the driver may be set to a normal level in operation S515.

In operation S512 of whether the gaze of the driver is looking ahead, when the gaze of the driver is looking ahead (YES), the activeness of the driver may be set to a high level in operation S516.

On the other hand, in operation S514 of determining whether the driver reacts to the moving camera, when the driver reacts to the moving camera (NO), the activeness of the driver may be set to a low level in operation S517.

In addition, according to another embodiment of the present disclosure, there is an additional effect that a person who is overly-immersed can be naturally reminded to think of driving by hearing the sound of the camera moving or seeing the LED moving together with the camera.

Each step included in the learning method described above may be implemented as a software module, a hardware module, or a combination thereof, which is executed by a computing device.

Also, an element for performing each step may be respectively implemented as first to two operational logics of a processor.

The software module may be provided in RAM, flash memory, ROM, erasable programmable read only memory (EPROM), electrical erasable programmable read only memory (EEPROM), a register, a hard disk, an attachable/detachable disk, or a storage medium (i.e., a memory and/or a storage) such as CD-ROM.

An exemplary storage medium may be coupled to the processor, and the processor may read out information from the storage medium and may write information in the storage medium. In other embodiments, the storage medium may be provided as one body with the processor.

The processor and the storage medium may be provided in application specific integrated circuit (ASIC). The ASIC may be provided in a user terminal. In other embodiments, the processor and the storage medium may be provided as individual components in a user terminal.

Exemplary methods according to embodiments may be expressed as a series of operation for clarity of description, but such a step does not limit a sequence in which operations are performed. Depending on the case, steps may be performed simultaneously or in different sequences.

In order to implement a method according to embodiments, a disclosed step may additionally include another step, include steps other than some steps, or include another additional step other than some steps.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

Although configurations of the present disclosure have been described in detail above with reference to the accompanying drawings, these are mere examples, and those of ordinary skill in the technical field to which the present disclosure pertains can make various modifications and changes within the technical spirit of the present disclosure. Therefore, the scope of the present invention should not be limited by the above-described embodiments but should be determined by the following claims.

What is claimed is:

1. A system for detecting activeness of a driver, the system comprising:
   a camera configured to photograph the driver;
   a camera moving module configured to move the camera; and
   a camera operation processor configured to
     detect the activeness of the driver by processing an image captured by the camera; and
     control the camera to move using the camera moving module according to the detected activeness of the driver,
   wherein the camera moving module comprises:
     a rail on which the camera is mounted to move; and
     a camera one-axis drive module configured to control the camera to move on the rail, and
   wherein the camera operation processor is further configured to monitor whether the driver reacts while the camera moves on the rail by the camera one-axis drive module so as to determine whether the driver is in an overly-immersed state or in a drowsy state.

2. The system of claim 1, wherein the camera moving module further comprises:
   a camera two-axis drive module configured to adjust an angle of the camera.

3. The system of claim 1, wherein the camera operation processor is further configured to:
   determine whether a gaze direction of the driver is looking ahead by recognizing a position of a face of the driver photographed by the camera; and
   when it is determined that the driver has been looking ahead for a predetermined time, set the activeness of the driver to a high level.

4. The system of claim 1, wherein the camera operation processor is further configured to:
   when it is determined that the driver has not been looking ahead for a predetermined time, move a position of the camera to photograph a face of the driver whose head is down; and
   when it is determined that the driver has been looking ahead for the predetermined time, set the activeness of the driver to normal.

5. The system of claim 4, wherein the camera operation processor is further configured to:
   determine whether the driver reacts to the movement of the camera; and
   when it is determined the driver reacts to the movement of the camera, set the activeness of the driver to a normal level.

6. The system of claim 5, wherein the camera operation processor is further configured to:
   when it is determined that the driver does not react to the movement of the camera, detect the face and the gaze direction of the driver to determine whether the driver is in a drowsy state; and
   when the driver is in the drowsy state, set the activeness of the driver to a low level.

7. The system of claim 6, wherein the camera operation processor is further configured to:
   when the driver is not in the drowsy state, determine whether the driver is looking ahead;
   when the driver is not looking ahead, detect the face and the gaze direction of the driver; and
   when the driver is looking ahead, determine whether the driver has been looking ahead for a predetermined time.

8. The system of claim 1, further comprising a display configured to display an operation state of the camera,
   wherein the display is located on one side of the camera and configured to change one of color and brightness according to the activeness of the driver.

9. The system of claim 8, wherein the camera operation processor is further configured to, when the camera is to be moved to determine whether the driver is in an intense state since the activeness of the driver is not at a high level, adjust an angle and a moving direction of the camera by comparing a previous frame and a current frame in terms of a driver recognized area.

10. A method for detecting activeness of a driver, the method comprising:
- photographing the driver via a camera movably mounted on a rail;
- determining whether a gaze of the driver is looking ahead by detecting the gaze of the driver from a captured image; and
- setting the activeness of the driver according to whether the gaze of the driver is looking ahead,
- wherein the setting of the activeness of the driver according to whether the gaze of the driver is looking ahead comprises:
- monitoring whether the driver reacts while the camera moves on the rail by a camera one-axis drive module so as to determine whether the driver is in an overly-immersed state or in the drowsy state.

11. The method of claim 10, wherein the setting of the activeness of the driver according to whether the gaze of the driver is looking ahead comprises:
- recognizing a gaze direction of the driver by recognizing a position of a face of the driver photographed by the camera;
- determining whether the recognized gaze direction of the driver is looking ahead; and
- when it is determined that the gaze of the driver is looking ahead, setting the activeness of the driver to a high level.

12. The method of claim 11, further comprising:
- when it is determined the gaze of the driver is not looking ahead, moving a position of the camera so as to photograph the face of the driver whose head is down;
- determining whether the driver has been looking ahead for a predetermined time from an image captured by the camera whose position has been moved; and
- when it is determined that the driver has been looking ahead for the predetermined time, setting the activeness of the driver to a normal level.

13. The method of claim 12, wherein the moving of the position of the camera so as to photograph the face of the driver whose head is down comprises:
- determining whether there is any reaction of the driver while the camera is moving; and
- when it is determined there is any reaction of the driver, setting the activeness of the driver to a normal level.

14. The method of claim 13, further comprising:
- when it is determined that there is no reaction of the driver, detecting the face and the gaze direction of the driver; and
- when the driver is in a drowsy state, setting the activeness of the driver to a low level.

15. The method of claim 14, further comprising:
- when the driver is not in the drowsy state, determining whether the driver is looking ahead;
- when the driver is not looking ahead in a state other than the drowsy state, detecting of the face and the gaze direction of the driver; and
- when the driver is looking ahead, determining whether the driver has been looking ahead for a predetermined time.

16. A method for detecting activeness of a driver, the method comprising:
- photographing the driver via a camera movably mounted on a rail;
- determining whether the gaze of the driver is looking ahead by detecting a gaze of the driver from a captured image;
- when it is determined that the gaze of the driver is looking ahead, moving the camera;
- determining whether the driver reacts to the moving camera based on an image captured by the moving camera; and
- when it is determined that the driver reacts to the moving camera, setting the activeness of the driver to a normal level,
- wherein the determining whether the driver reacts to the moving camera based on an image captured by the moving camera comprises:
- monitoring whether the driver reacts while the camera moves on the rail by a camera one-axis drive module so as to determine whether the driver is in an overly-immersed state or in the drowsy state.

17. The method of claim 16, further comprising:
- when it is determined that the gaze of the driver is looking ahead, setting the activeness of the driver to a high level.

18. The method of claim 16, further comprising:
- when it is determined that the driver does not react to the moving camera, setting the activeness of the driver to a low level.

* * * * *